(No Model.) 6 Sheets—Sheet 1.
C. W. WEISS.
ELECTRO MAGNETIC ADDING MACHINE.
No. 348,437. Patented Aug. 31, 1886.

Attest:
John A. Ellis
A B Moore

Inventor:
Charles W. Weiss
By David A Burr
Atty.

(No Model.)  6 Sheets—Sheet 2.
C. W. WEISS.
ELECTRO MAGNETIC ADDING MACHINE.
No. 348,437.  Patented Aug. 31, 1886.

Attest:
John A. Ellis.
A. B. Moore.

Inventor:
Charles W. Weiss
By David A. Burr
Atty.

(No Model.) 6 Sheets—Sheet 3.

C. W. WEISS.
ELECTRO MAGNETIC ADDING MACHINE.

No. 348,437. Patented Aug. 31, 1886.

Fig.3.

(No Model.)  6 Sheets—Sheet 4.

C. W. WEISS.
ELECTRO MAGNETIC ADDING MACHINE.

No. 348,437.  Patented Aug. 31, 1886.

Fig. 4.

Attest:
John A. Ellis.
A. B. Moore.

Inventor:
Charles W. Weiss
By David A. Burr
Atty.

(No Model.) 6 Sheets—Sheet 5.
C. W. WEISS.
ELECTRO MAGNETIC ADDING MACHINE.

No. 348,437. Patented Aug. 31, 1886.

Attest:
John A. Ellis
A. B. Moore

Inventor:
Charles W. Weiss
By David A. Burr
Atty.

(No Model.) 6 Sheets—Sheet 6.
C. W. WEISS.
ELECTRO MAGNETIC ADDING MACHINE.

No. 348,437. Patented Aug. 31, 1886.

UNITED STATES PATENT OFFICE.

CHARLES W. WEISS, OF BROOKLYN, ASSIGNOR TO THE KRUSE CHECK AND ADDING MACHINE COMPANY, OF NEW YORK, N. Y.

ELECTRO-MAGNETIC ADDING-MACHINE.

SPECIFICATION forming part of Letters Patent No. 348,437, dated August 31, 1886.

Application filed October 26, 1885. Serial No. 180,931. (No model.)

*To all whom it may concern:*

Be it known that I, CHARLES W. WEISS, of Brooklyn, in the county of Kings and State of New York, have invented a new and useful Improvement in Electro-Magnetic Adding-Machines; and I do hereby declare that the following is a full and exact description thereof, reference being had to the accompanying drawings and to the letters of reference marked thereon, making a part of this specification.

My invention relates to an improvement in adding and registering machines, and has for its object to produce by means of electricity a movement of the adding mechanism in response to that of the counting or transmitting instrument at any distance therefrom, either with or without an independent movement of the several adding-wheels in the adding mechanism, and to obtain likewise a simultaneous movement of any desired number of independent adding-machines by the use of a single counting or transmitting instrument.

In the accompanying drawings.

Figure 1:
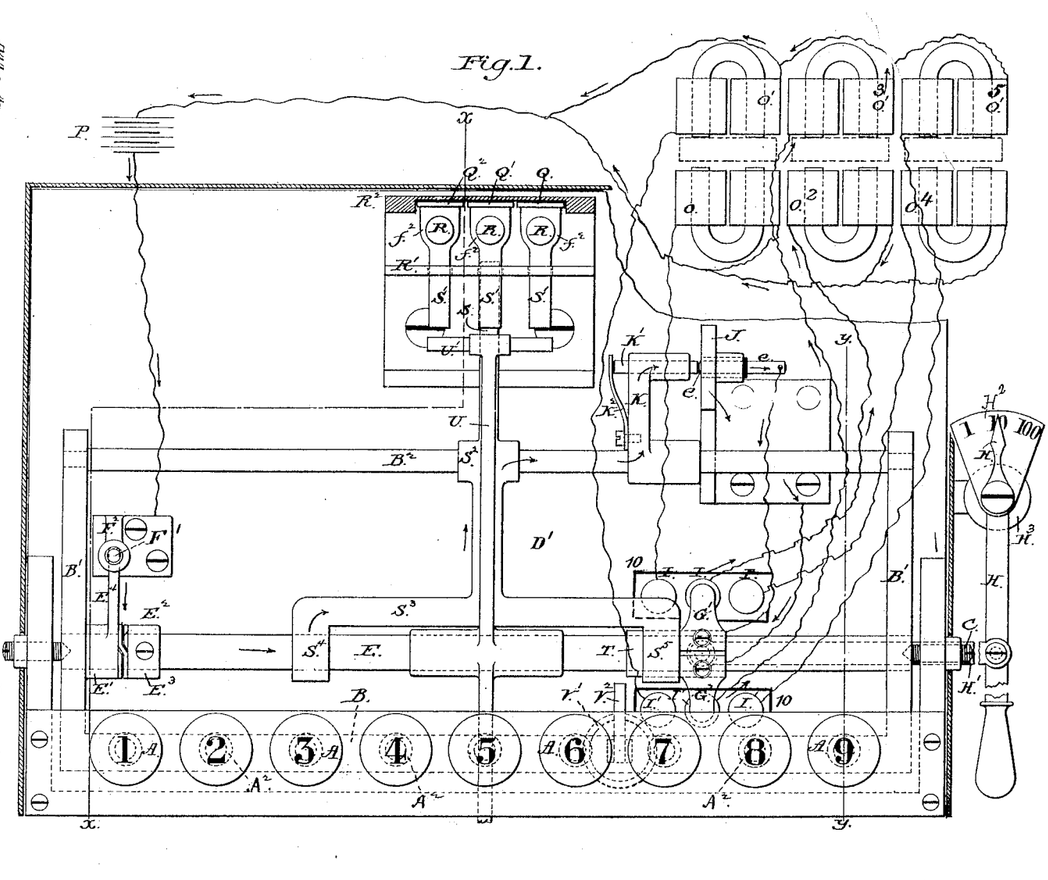
Figure 1 is a plan view of the transmitting and indicating instrument, and of the electro-magnets actuating the wheels of an adding-machine constructed so that each wheel may move independently of the other as well as in train.
Figure 2:
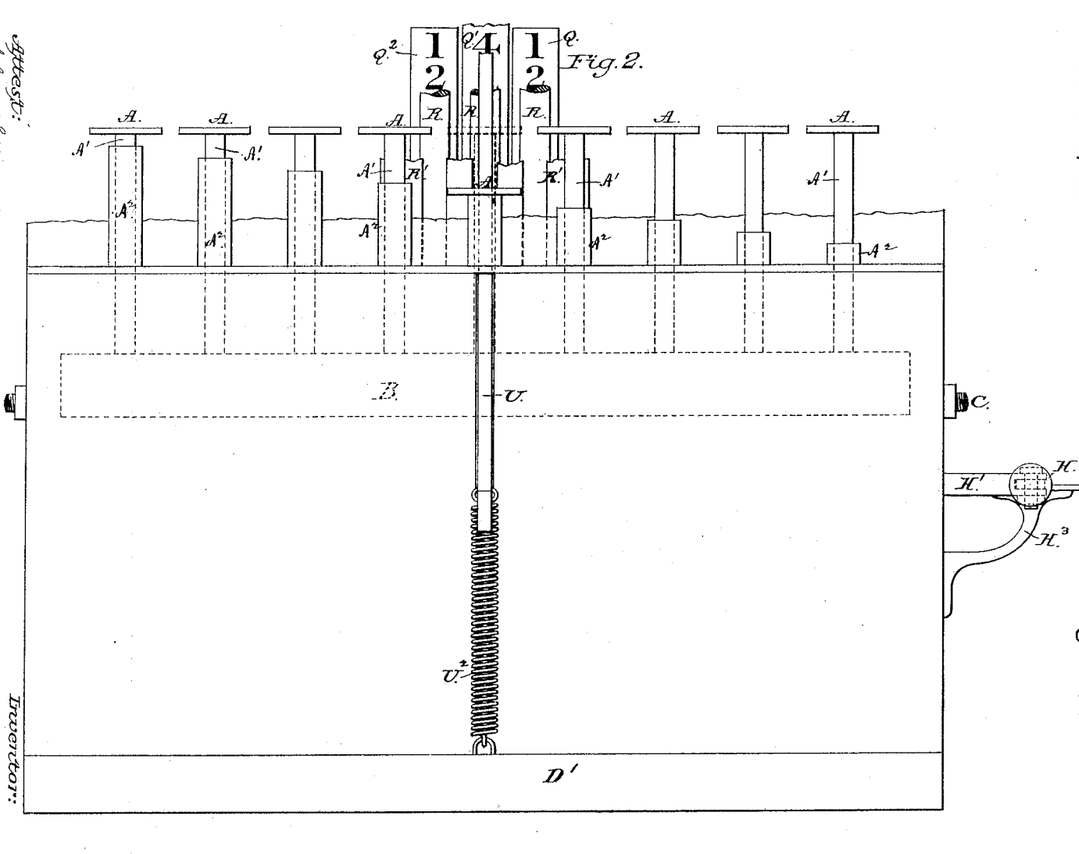
Fig. 2, a front elevation of the transmitting-instrument.

A A A, Figs. 1 and 2, represent the keys of the transmitting-instrument, by means of which the numbers to be added are indicated. These keys are mounted upon pins $A'\,A'$, each of which plays vertically in a fixed tube, $A^2$, (see Figs. 1, 2, 3, and 4,) and rests upon the longitudinal front bar, B, of an oscillating frame, B $B^2$ $B'$ $B^3$. The frame is pivoted upon that side of the middle of its width nearest to the front bar, B, between pivot-pins C C, projecting through the side bars of the frame D of the machine into pivotal sockets in the side bars, $B'\,B'$, so that the superior weight of the rear part, $B^2$, of the frame will automatically lift the front bar, B, and the keys resting thereon. The key-tubes $A^2\,A^2$ (see Fig. 2) gradually increase in length from one end of the bar to the other, so that each key from left to right has a longer movement than that preceding it, and consequently imparts a correspondingly greater movement to the oscillating frame. A transverse axial rod, E, is fitted and secured longitudinally in the frame, to extend from the pivotal point C on the one side to that C on the other. (See Fig. 1.) Upon this axial rod E, and at one end thereof, a hub, $E'$, is pivoted between the side bar, $B'$, of the oscillating frame and a spring-washer, $E^2$, which is held securely against the hub in frictional contact therewith by means of a nut, $E^3$. A finger, $E^4$, projects from the hub, and its extremity plays between an insulated stop, or stop of insulating material, F, and a metallic point, $F'$, both mounted upon a metallic standard, $F^2$. The interval between the insulated and metallic points F $F'$ is very small, so that a slight movement of the finger $F^4$ will serve to change its contact from the one to the other. This change of contact will occur at the beginning of a movement of the frame B $B'$ $B'$ $B^2$ in either direction, the play of the hub $E'$, upon the axial rod E, permitting a continuance of the movement of the frame after that of the finger $E^4$ is arrested, although the friction of the washer $E^2$ will suffice to carry the finger from the one point to the other. An automatic adjustment of the finger is thus secured, which permits it to adjust itself to the variations in the movement of the oscillating frame, so that contact is maintained with the metallic point $F'$, to close the circuit constantly during said movement, whether it be long or short, and yet is instantly broken the moment the movement is reversed.

G (see Fig. 4) represents a block fitted to slide freely upon the axial rod E, and which is connected by means of a coupling-bar, $H'$, extending out under the rod E, and parallel with it to the longer end of a lever, H, pivoted to a fixed support, $H^2$, outside the frame. This lever serves to move the block G back and forth along the rod E, while its shorter end beyond its pivot serves to indicate upon a scale or index-plate, $H^2$, fitted under it, the position of the block.

Upon the upper face of the block G, over the rod E, two independent plates, $G'$ and $G^2$, are secured, each insulated from the other and from the block and rod. These plates project out beyond the block on either side to come into contact simultaneously with a pair of metallic pillars I $I'$, (see Figs. 1 and 4,) placed one on each side of the rod, which are insulated in any suitable manner—as, for example, by securing them upon plates of rubber, 10, made fast to the bed-plate D of the machine.

Where the instrument is to be used in connection with an adding device permitting an independent movement of its adding-wheels, as many pairs of pillars I $I'$ are placed along the rod as there are adding-wheels, and the index-plate $H^2$, under the lever bears a corresponding number of divisions.

In the drawings, the instrument is represented as working with three adding-wheels, indicating units, tens, and hundreds, to be moved, if desired, independently each of the other, and the lever H is shown as having three movements to carry the block G, and its plates $G'$ and $G^2$ into contact with either one of three pairs of pillars, I $I'$, I $I'$, I $I'$, placed in position for the purpose, as shown in Fig. 1. If but one adding-wheel is to be actuated the insulated plates $G'$ $G^2$ may be secured upon the rod E, and the lever H dispensed with.

J (see Figs. 3 and 4) represents a curved standard mounted in a vertical plane and over against the side of which a commutator-arm, K, made fast to the rear bar, $B^2$, of the oscillating frame to project rearwardly therefrom, is made to play up and down in unison with the oscillation of said frame. A series of insulated metallic pins or contact-points, $e$ $e$, numbered 1 2 3 4, &c., corresponding in number to the number of keys in the instrument, are fitted at equal distances apart on this standard upon an arc having the axis of the frame as its center, whereby a spring-actuated pin, $K'$, fitted transversely in the end of the arm K, is brought to bear upon said points in succession in the oscillation of the frame. $K^2$ represents the spring actuating said pin. The distances between the points $e$ $e$ is so proportioned that the movement of the frame, when the first key is struck, shall bring the pin $K'$ into contact with the first point, 1; the movement produced by the second key into contact with the second point, 2; that of the third with the third point, 3, and so on. The lowermost point is made to correspond with the first key or key of shortest movement, so that the automatic movement of the frame when it is released from the pressure of the keys will always carry the contact-pin $K'$ below the first point, in position to be brought into contact therewith when the first key is depressed. It will be observed that to reach the point of the highest number—as, for instance, 9—the contact-pin will, to reach it, pass in succession over each contact-point $e$ $e$ below it, and over a blank space between each of said points.

Figure 6:
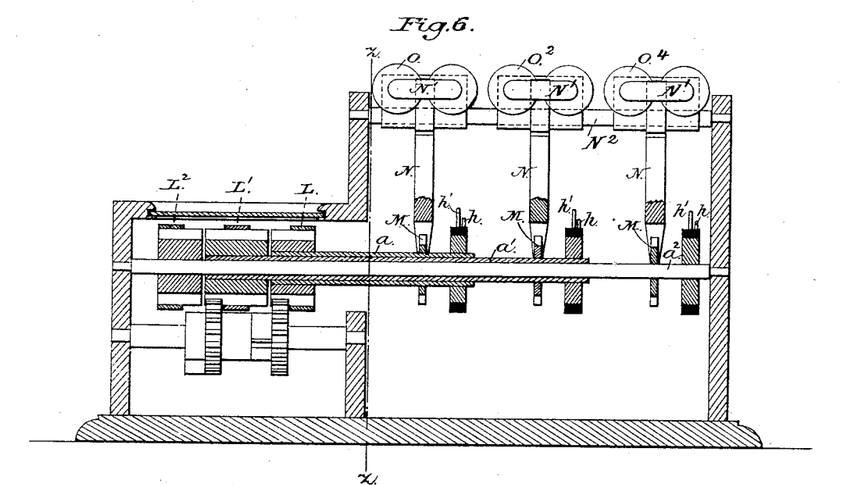

L $L'$ $L^2$ (see Fig. 6) represent, respectively, the units, tens, and hundreds wheels in an adding machine, so geared as that the ten movements of the units-wheel L, producing a complete revolution thereof, shall produce a single movement of the second or "tens" wheel, $L'$, whose complete revolution is thus produced by each ten revolutions of the units-wheel, while ten revolutions of the second or tens wheel, $L'$, will in like manner produce one complete revolution of the next or "hundreds" wheel, $L^2$. The hundreds-wheel $L^2$ is secured upon a horizontal shaft, $a^2$, mounted to rotate in suitable bearings at either end in the frame $D^2$ of the machine, as shown in Fig. 6. The tens-wheel $L'$ is secured upon a tubular shaft or sleeve, $a'$, mounted to rotate upon the shaft $a^2$ on its axis, and the units-wheel L upon a tubular shaft or sleeve, $a$, mounted to rotate upon the sleeve $a'$, as its axis, the sleeve $a'$ being made shorter than the shaft $a^2$, and the sleeve $a$ shorter than the sleeve $a'$, so that the units, tens, and hundreds wheels may revolve side by side, as illustrated in Fig. 6.

Upon the inner end of the concentric tubular shaft or sleeve $a$, carrying the units-wheel L, a toothed wheel, M, formed with twenty teeth, is secured, to be actuated by the alternate engagement therewith on opposite sides thereof of two pawls, $b$ $b'$, carried by a pendulum or oscillating lever, N, pivoted immediately over the wheel upon a pivot or pivotal shaft, $N^2$, and whose upper arm, projecting above its pivot, is made fast to an armature-piece, $N'$, vibrating between the ends of two electro-magnets, O $O'$. The movement of the armature $N'$ toward one of these magnets O will, by the engagement of the pawl $b$, upon that side of the wheel, with the corresponding tooth of said wheel, move it forward one-twentieth of a revolution. A reverse movement of the armature, produced by the attraction of the opposite magnet, $O'$, will, in like manner, operate to move the wheel in the same direction a twentieth revolution. Thus each to-and-fro movement of the armature $N'$ and its pendulum N will operate to move the adding-wheel one point, or one-tenth of a revolution. The concentric tubular axial shafts or sleeves $a'$ and $a^2$, carrying the adding-wheels $L'$ and $L^2$, are also fitted each in like manner with a toothed wheel, M, to be operated by a swinging armature vibrating between magnets $O^2$ $O^3$ $O^4$ $O^5$, similar to the magnets O $O'$, as shown in Fig. 6.

P, Fig. 1, represents an electric battery, whose poles are connected, respectively, by means of suitable conductors, the one with the point $F'$ on the standard $F^2$ and the other with the magnets O and $O'$, $O^2$ $O^3$, and $O^4$ $O^5$. The opposite end of the coil of the one magnet, O $O^2$ $O^4$, in each pair is connected by a wire or suitable conductor with one of the pillars, I, which contact with the plate G', and the end of the coil of the second magnet, O' O³ O⁵, is similarly connected with the opposite pillar, I', which comes into contact with the insulated plate G². The plate G' is connected by an electrical conductor with the entire series of insulated contact-points e e in the standard J, and the plate G² is similarly connected with the standard J.

Q Q' Q² (see Figs. 1, 2, 3, and 4) represent narrow vertical plates or slides, one for each of the three adding-wheels. Each plate is secured to a sliding collar, $f$, moving on a vertical rod or bar, R, secured to the base of the machine, and is fitted to move therewith just inside of the back plate of the casing of the machine. The sliding collar $f$ is coupled by a plate, $f'$, to a second collar, $f^2$, so as to steady its movement, this end being further secured by causing the plate $f'$ to move in a vertical slot cut to receive it in a fixed transverse plate, R', secured to the bed of the machine in front of the slides. The slides play upon and into an upper compartment, R², of the casing, which conceals them, a single opening being, however, left in the casing at $t$, both front and rear, over each slide, through which the figures marked upon its opposite faces may be seen when the slide is elevated. The slides are elevated singly when the frame is oscillated by means of an arm, S, projecting from the rear bar, B², of the frame and moving in unison therewith, and which extends far enough to engage a toe, S', projecting from the collar $f$ of the slide. The arm S is formed with a sleeve, S², sliding upon the rear bar, B², of the frame, and its inner end is fitted to a forked bar, S³, whose two ends also terminate in sleeves S⁴ S⁵ sliding upon the axial shaft E of the instrument. The arm S is thus left free to slide in the frame B B' B' B² with a steady movement while it is made to partake of its oscillation. The purpose of this sliding movement is to permit the arm to be carried under the toe S' of the particular slide Q, Q', or Q², which is appropriate to the particular adding-wheel which the instrument is made by the position of the lever H to operate, be it the unit, tens, or hundreds wheel. The sliding movement is produced when the lever H is moved by means of a coupling-plate, T, extending from the under side of the block G to embrace the sleeve S⁵ next thereto, as shown in Fig. 1. The block G when moved is thus made to move with it the arm S to bring it in position to actuate the slide (see Q', Figs. 1 and 2) corresponding to the posts I I' at which the block is set, and to the adding-wheel, (see L', Fig. 6,) whose magnet is brought into circuit through said posts. Each slide is so graduated and marked with respect to the movement of the oscillating frame B B' B' B² that when the key No. 1 is depressed, the figure 1 on the slide will appear at the opening $t$ in the casing over the slide, and when the key No. 9 is depressed the figure 9 on the slide will thus appear. The friction of the collars $f$ $f^2$ on the bar R (see Fig. 3) is sufficient to retain the slide in the position to which it is elevated after the arm S has dropped back to its first position, (see dotted lines, Figs. 3 and 4,) so that the number brought in sight will remain exposed to view. It is returned to its first position in readiness for the next movement by means of a depressing-lever, U, (see Figs. 3 and 4,) pivoted upon the axial rod E of the frame, so that its inner arm shall extend out over the rear bar, B², and over the toes S' of the slides, and its outer arm, bent to pass under the front arm, B, of the frame, shall project from the front of the machine. The inner arm of this depressing-lever U is fitted with a transverse horizontal bar, U', at right angles therewith, of a length to extend over the toes S' S' of all of the slides, so as to engage either one of them which may be elevated. Its outer arm is drawn down automatically by a spring, U², which tends to keep the inner arm elevated. By lifting the outer arm the inner arm is depressed far enough to carry down either slide, Q, Q', or Q², which may be elevated.

V (see dotted lines in Figs. 3 and 4) represents a piston working in a close cylinder, V', and connected by a coupling-bar, V², with the front or key bar, B, of the machine, for the purpose of cushioning and steadying its movement.

Figure 5:
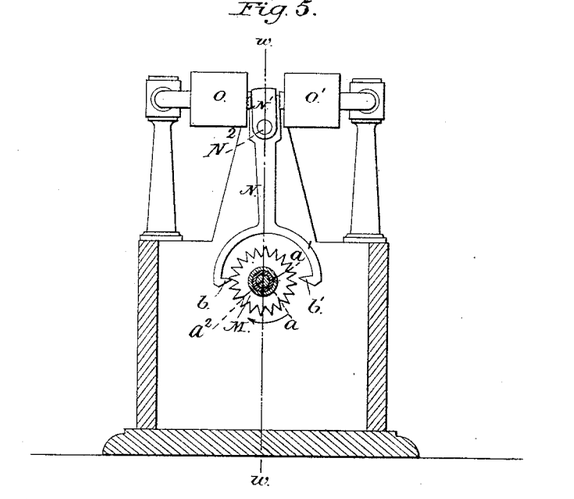
Figs. 5, 6, and 7, details of the adding-machine, Fig. 5 being a vertical transverse section in line $z\,z$ of Fig. 6, Fig. 6 a longitudinal horizontal section in line $w\,w$ of Fig. 5, and Fig. 7 a detached side elevation of one of the commutating-wheels detached.
Figure 7:
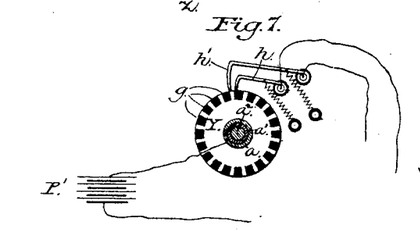

Y, Fig. 7, represents a commutating-wheel to be fitted upon the shaft of each adding-wheel when it is desired to produce a synchronous movement of similar adding-wheels at a distance. This commutating-wheel is fitted upon its periphery with twenty equal blocks, $g$ $g$ $g$, of rubber or other insulating material, separated by twenty intervening metallic spaces. Two metallic spring-actuated fingers, $h$ $h'$, are made to bear with an elastic pressure upon this periphery of the wheel in such manner that when one of the fingers is upon an insulated block, $g$, the other shall rest upon one of the blank spaces. The wheel is connected by an electrical conductor with a battery, P', Fig. 7, whose opposite poles are connected in like manner with one end of the coil in each of a pair of electro-magnets, (not shown in the drawings,) the opposite ends of whose coils are connected, respectively, with the two fingers $h$ and $h'$, and between which an armature is made to vibrate, and thereby actuate a wheel of twenty teeth mounted upon the axis of the adding-wheel corresponding to that to which the commutator Y is applied, all in manner substantially as hereinbefore described, and as illustrated in Figs. 5 and 6 of the drawings, and which need not, therefore, be repeated.

In the operation of the commutating-wheel Y, when the one finger, $h$, is insulated from the wheel the other, $h'$, is in contact therewith and the circuit from the battery closed through it to excite one of the magnets and thereby swing the armature-lever to one side and cause its pawl to move the toothed wheel and the adding-wheel upon the same shaft one-twentieth of a revolution; while, so soon as, by the rotation of the commutator, the finger $h$ is carried upon an insulated point, $g$, the circuit is closed through the other finger, $h'$, and the armature-lever thrown to the opposite side to complete the one-tenth movement of the adding-wheel. The insulated points are so proportioned in length that so soon as the movement of the adding-wheel carrying the commutator is completed, both fingers $h$ and $h'$ rest upon a block, $g$, and become thereby insulated, while in each movement of the adding-wheel each finger is in turn brought into contact with the wheel to close a circuit, as described.

Figure 8:
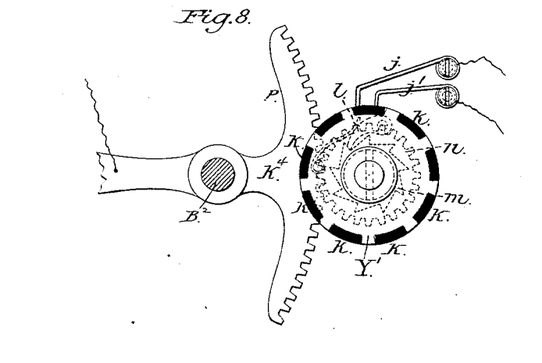
Fig. 8 is a side view, and Fig. 9 a plan view, illustrating a modification in the construction of the commutating device for the transmitting-instrument.
Figure 9:
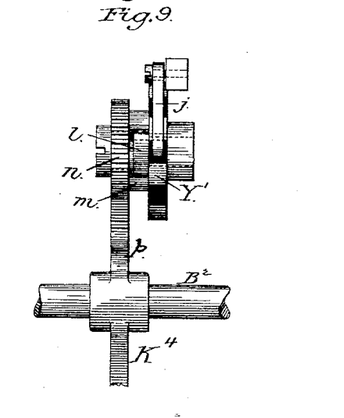

I contemplate, as an equivalent for the reciprocating commutator-arm K, a circular commutator or commutating-wheel, Y', Fig. 8, similar to the wheel Y, Fig. 7, whose periphery is formed to present as many contact-points to a pair of fingers $j\ j'$, bearing thereon, as there are keys in the transmitting-instrument, one for each, these contact-points being separated by blocks $k\ k$ of rubber or other insulating material. The fingers $j\ j'$ are so placed that they may both rest upon an insulating point and the interval between them is so proportioned with respect to the length of the contact-points that when one finger is upon a contact-point the other shall necessarily be upon an insulated block. A pawl, $l$, is fitted to the side of the commutating-wheel Y' to engage a ratchet-wheel, $m$, secured to a toothed wheel, $n$, which is engaged by a segmental rack, $p$, upon the end of an arm, $K^4$, projecting from the rear bar, $B^2$, of the oscillating frame of the instrument. The toothed wheel $n$ is so proportioned with respect to the segmental rack $p$, that a complete upward movement of the rack in unison with the upward movement of the rear bar of the oscillating frame produced by a depression of the last key, 9, in the series, will produce a complete revolution of the ratchet-wheel and of the commutator, these remaining stationary during its return. The commutator-wheel Y' is so adjusted upon its axis with reference to the segmental rack $p$ and gear-wheel $n$, that when the movement of the commutator-wheel ceases the contact-fingers $j\ j'$ shall invariably both rest upon one of the insulated blocks $k$, and shall both pass in succession over a number of contact-points equal to the number of the particular key whose depression produces its movement. The electrical connections with the battery and magnets are effected by means of suitable electric conductors connecting one of the contact-fingers with each one of the pillars I I I, and the other, $j'$, with each of the opposite pillars, I' I' I', in the transmitting-instrument. One pole of the battery is connected with the segmental rack, either directly or mediately through the oscillating frame, and the other with one end of the coil of the magnets in each pair, as described, the opposite end of the coil in one magnet in each pair being connected with one of the pillars, I, and the other with its opposite pillar, I', whereby the circuit is switched in the manner as above described.

In the operation of my improved apparatus, if it is desired to count by units, the lever H is turned until its index-finger points to the figure 1. This movement of the lever will cause the switch-plates G G' to slide into contact, respectively, with the pillars I and I', which are in connection, respectively, with magnets O and O', actuating the unit-adding wheel, and thus establish a connection between said magnets and the commutating-points on the standard J. At the same time, by reason of the engagement of the sleeve $S^5$ by the coupling-bar T, the index-lever S is carried over by the movement of the lever H, so as to engage the slide Q, indicating the units. If it is desired to count by tens, the lever H is turned, as illustrated in the drawings, to the figure 10, and the switch-plates are thereby made to bring, in manner as described, the magnets of the second or tens-adding wheel into connection with the commutating-points on the standard J, and the index-lever S into engagement with the index-slide Q', Figs. 1 and 2, indicating the tens, as shown by positive lines in the drawings. If in either case one of the keys—as, for example, the fifth key, (see Fig. 2,)—be depressed, its depression will operate to cause an oscillation of the frame B B' B' B². The extent of this movement, governed by the length of the tube $a^2$, in which the key-pin plays, is determined by a number of units of movement corresponding to the number on the key. At the first movement of the frame the switch-finger $E^4$ is brought into contact with the point F', and an electrical connection is closed between the battery P and the oscillating frame, and as the commutating-pin K', carried by the arm K, is yet in contact with the standard J, a circuit is instantly closed through said standard, the pillar I', the plate $G^2$, and the coil of the magnet $O^2$ to the battery P, whereby the magnet $O^2$ will be made to attract the armature N' toward it, and thereby swing the lever N, so as to cause its pawl $b$ to move the ratchet-wheel M, and with it the adding-wheel L, one twentieth of a revolution. As, however, the movement of the frame B B' B' B² continues, the pin K' will be brought into contact with the first insulated contact-pin $e$, and thereupon the circuit through the magnet O, as described, will be broken and a circuit closed from the pin $e$ through the pillar I, the plate G' and the coil of the opposite magnet, $O^3$, to the battery, thereby causing the armature to move in the opposite direction and by means of the pawl-lever N and its ratchet $b'$ actuate the ratchet-wheel L and cause the adding-wheel to move another twentieth of a revolution. The further movement of the frame will thus produce an alternate make or break of the circuits through the two magnets producing a tenth revolution of the adding-wheel as each contact-point *e* is passed, so that if the movement ceases at the fifth, as illustrated, the adding-wheel will have moved five points, (designated by the number of the key taken in connection with the position of the lever H,) and will indicate the sum of these points added to the number previously registered. As the oscillating frame moves the required distance the indicating-slide Q' moves with it, so that when the movement of the one is completed the other will indicate the degree of movement by a number which will correspond with the number of the key struck and which will remain in sight until the slide is depressed to its first position by a movement of the depressing-lever U produced by lifting its outer end. So soon as the key is relieved from pressure the frame will automatically drop back to its first position by reason of the superior weight of its inner end, $B^2$; but the instant this return movement commences, and before the pin K' passes into contact with the point *e* over which it has last passed, the contact of the switch-finger $E^4$ with the point F' is broken and the circuit from the battery thereby opened.

Figures 10, 12:
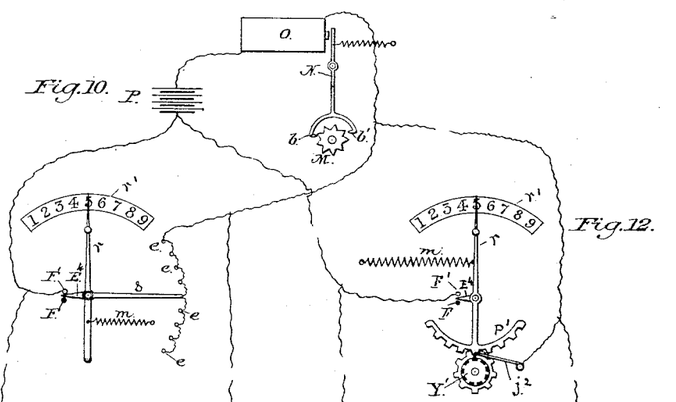
Figs. 10 to 13 diagrams illustrating modifications in the transmitter.
Figure 11:
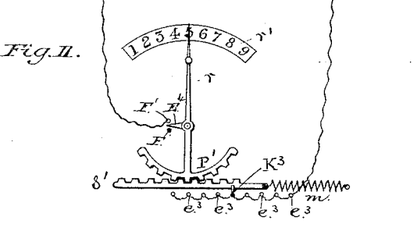
Figure 13:
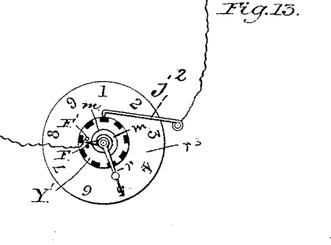

I contemplate the substitution of many known devices as mechanical equivalents for those herein described and illustrated—as, for example, an equivalent for the series of keys actuating by progressive movements an oscillating frame, or a lever, to actuate a commutating-arm, K, carrying a commutating-pin over a series of commutating-points, *e e*, a spring-actuated index-hand, *r*, moving over an index-plate, *r'*, having divisions corresponding in number to the keys, may be made to actuate a commutating-arm, *s*, so as to carry it over the series of contact-points, as illustrated in the diagram, Fig. 10; or, as is illustrated in diagram Fig. 11, such an index-hand, *r*, may be affixed to one arm of a lever whose opposite arm carries a segmental rack, P', engaging a spring-actuated sliding-bar, *s'*, which in turn carries a commutating-point, $K^3$, over a double series of contact-points, $e^3 e^3 e^3$; or the segmental rack P', actuated by the index-hand *r*, may be geared to a commutating-wheel, Y', (see Fig. 12,) upon whose periphery the double series of contact-points are arranged to pass, as the wheel revolves, under a commutating-finger, $j^2$, in manner as shown in diagram Fig. 12; or, the index-hand *r* may be made to revolve over a dial, $r^3$, (see diagram Fig. 13,) and to carry in its revolution a commutator-wheel, Y', fixed to its axis and against whose contact-points a commutating-finger, $j^2$, is made to bear.

Figure 3:
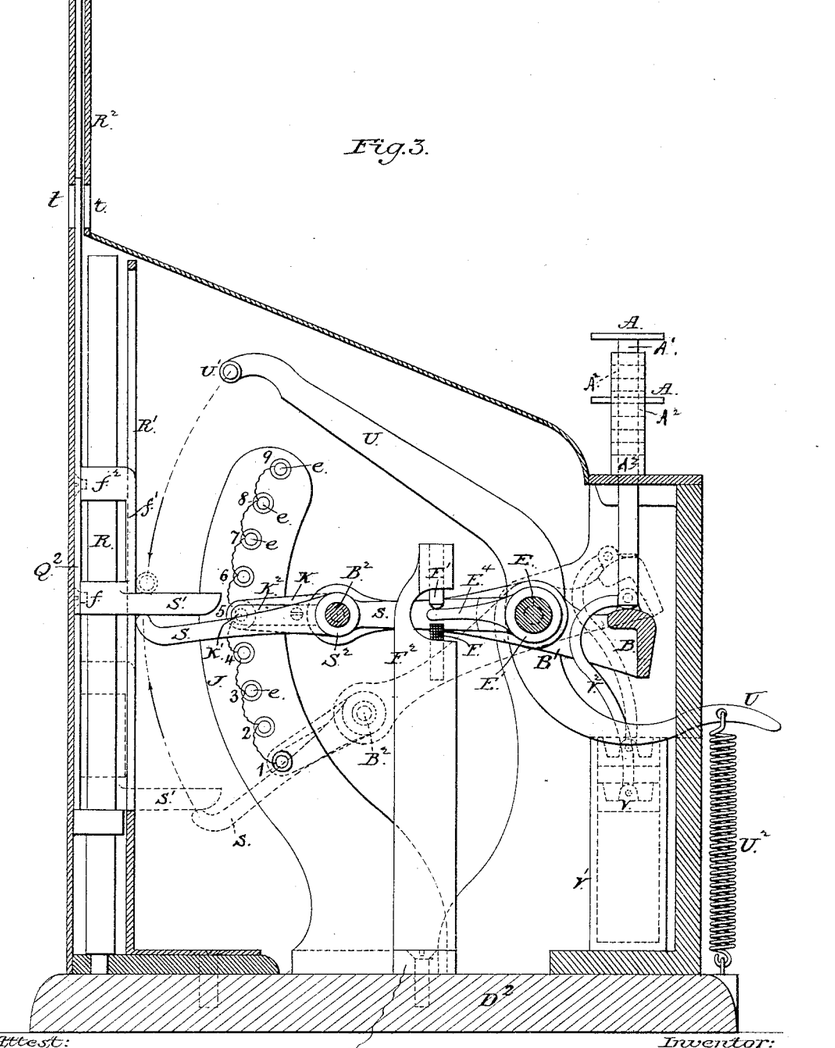
Fig. 3, an irregular section in line $x\,x$ of Fig. 1.
Figure 4:
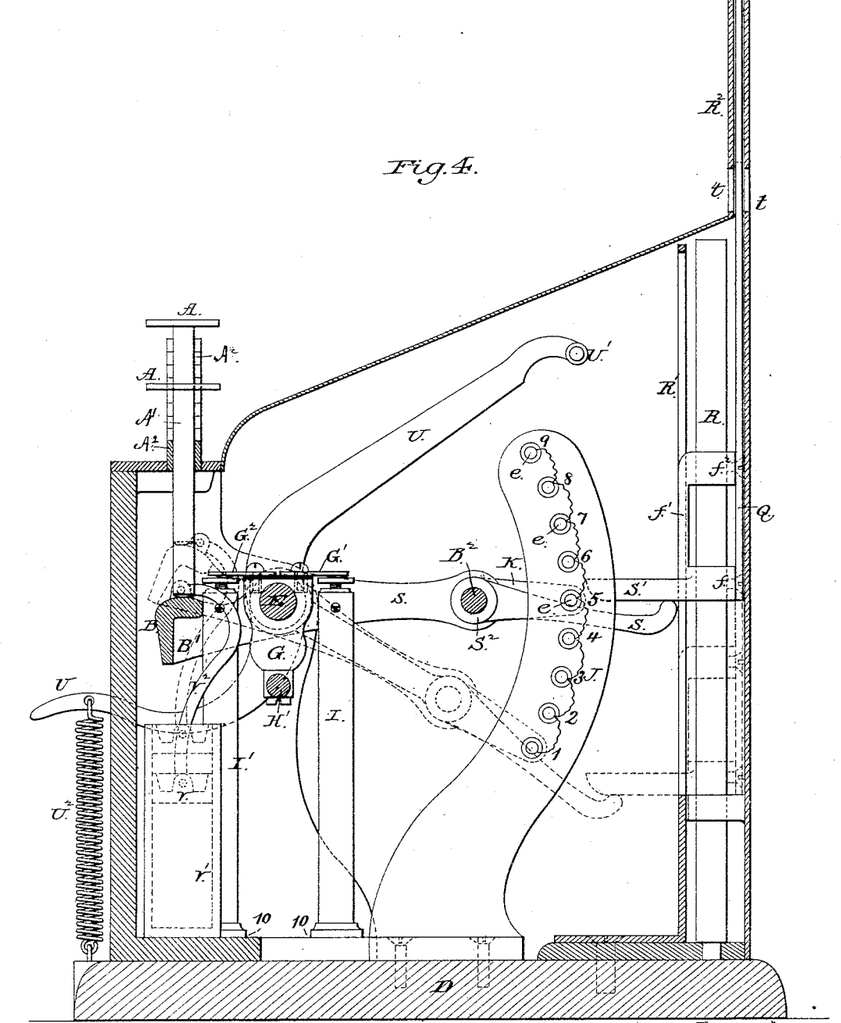
Fig. 4, a transverse section in the plane indicated by the line $y\,y$ of Fig. 1.

In each of these devices, illustrated in the diagrams Figs. 10 to 13, the index-hand is made to return automatically so soon as released to its first position by means of a spring, *m*, and in each the spindle carrying the hand is fitted with a finger, $E^4$, turning upon the spindle to vibrate between a stop, F, and contact-point F', and made to move with the spindle by a friction-washer, permitting its independent movement, as fully illustrated in Fig. 3. It is evident also that instead of causing the pins A' A', bearing the keys A A A, to play through tubes $A^2$ of graduated length serving as stops, the pins themselves may be graduated and the tubes be made of uniform length; also that instead of causing the lever H to move the switch-plates G and G' over the pillars I and I', a series of three plates, *i i', i i', i i'*, corresponding to said pillars and similarly connected with the respective magnets of the adding-wheels may be placed under the lever H, and a pair of switch points or plates, $g' g^2$, connected, respectively, with the standard J and points *e e*, be placed upon said lever to move with it into connection with either one of said pairs of plates, *i i'*, as required.

I claim as my invention—

1. The combination, with a pair of electro-magnets adjusted upon opposite sides of an interposed vibrating armature and with a battery for exciting the same, of an adding-wheel actuated, substantially as described, by the vibration of the armature, a series of separate contact-points severally connected by an electrical conductor with one pole of the battery, a corresponding series of intermediate contact-points insulated from the first, but all connected in a circuit through the coils of both magnets with the same pole of the battery, and a commutating device, substantially as described, connected with the opposite pole of the battery, and moving over the two series of points to close an electric circuit from the battery alternately through the one magnet and the other, substantially in the manner and for the purpose herein set forth.

2. The combination, with a battery and a reciprocating rotating shaft, of an arm fitted upon the shaft to turn therewith when free, and to turn thereon when engaged, an electrical conductor connecting said arm with one pole of the battery, an electric contact-point connected with the opposite pole of the battery, and against which the arm plays in its movement, and an opposite insulated stop, whereby the arm is engaged and its movement to and from the point limited, substantially in the manner and for the purpose herein set forth.

3. The combination, with a pair of electro-magnets adjusted upon opposite sides of an interposed vibrating armature, a battery for exciting the same, and an adding-wheel actuated substantially as described by the vibration of the armature, of two or more pairs of separate contact-points each electrically connected with the same pole of the battery, the one in circuit with the coil of one of the magnets and the other in circuit with the coil of the opposite magnet, an oscillating switch-lever or commutator connected with the opposite pole of said battery and mounted to move over said points into successive separate contact with each of them, and a series of keys actuating said lever each to produce a different definite number of contacts thereof with said points, substantially in the manner and for the purpose herein set forth.

4. The combination, with an electric battery, a series of separated contact-points severally connected by a suitable conductor with one pole of the battery, a corresponding series of intermediate contact-points alternating with the first, but insulated therefrom and connected with the same pole of said battery, and a commutating device, substantially as described, connected with the opposite pole of the battery and moving into and out of contact with said points in succession, of a series of independent adding-wheels, vibrating levers carrying pawls each actuating intermittingly one of said adding-wheels, an armature upon each lever, magnets placed severally on one side of each armature to attract the same in one direction, each magnet having its coil included in the circuit between the first set of contact-points and the battery, magnets placed in like manner severally on the opposite side of each armature to attract the same in the opposite direction, each having its coil included in the circuit between the second set of contact-points and the battery, and a switch or commutating device, substantially as described, made to open and close simultaneously by its movement the two circuits for either pair of magnets, substantially in the manner and for the purpose herein set forth.

5. The combination, with an oscillating frame, B B' B' B², of a series of keys, A A, supported by pins resting upon the front bar of said frame, a series of fixed tubes graduated in length, through which the key-pins play, an electric battery, P, having one of its poles connected with said frame, a pair of opposed magnets, O O', having one end of the coil in each connected with the opposite pole of the battery, an armature, N', vibrating between said magnets, a pawl-lever, N, actuated by said armature, an adding-wheel actuated by said pawl-lever, a series of contact-points, $e\,e\,e$, connected severally with the opposite end of the coil of one of the magnets, a second series of insulated contact-points arranged intermediate the first to alternate therewith and connect severally with the opposite end of the coil of the other magnet, and a commutating-arm, K, carried by the oscillating frame to move in unison therewith over the two series of contact-points and close by successive contacts therewith in its movement a circuit from the battery alternately through the one magnet and the other, substantially in the manner and for the purpose herein set forth.

6. The combination, with a series of two or more adding-wheels, a pawl-lever actuating each wheel, an armature carried by each lever, a pair of magnets placed respectively on each side of said armature to attract it in opposite directions, a battery having one of its poles connected to one end of the coil of each magnet, a series of switch-points, one for each pair of magnets, severally connected by an electrical conductor each with the opposite end of the coil in one magnet in each pair, a second series of switch-points, one for each pair of magnets, placed parallel or concentric with and opposite to the first, and severally connected by an electric conductor each with the opposite end of the second magnet in each pair, two insulated switch-plates connected to move in unison and simultaneously into contact, the one with the switch-point connected to one magnet and the other with the switch-point connected with the other magnet in each pair, a series of contact-points connected severally with one of said switch-plates, a second series of insulated contact-points arranged intermediate the first, and severally connected with the other switch-plate, a commutating-arm and point traversing both series of contact-points to pass alternately over a point in the one and in the other, and connected by an electric conductor with the opposite pole of the battery, a lever coupled to the connected switch-plates to move them from one pair of switch-points to another, and an index-plate over which one end of said lever moves, marked to denote the particular adding-wheel brought into action by the particular position of the switch-plates to which they are carried by the lever, all substantially in the manner and for the purpose herein set forth.

7. The combination, with an adding-wheel, L, a pawl-lever, N, actuating said wheel, an armature, N', carried by the lever, a pair of magnets, O O', placed, respectively, on each side of said armature, a battery, P, having one of its poles connected to one end of the coil of each magnet, a series of contact-points, $e\,e$, corresponding in number with the figures on the adding-wheel, connected severally with the opposite end of the coil of one magnet, O, a second series of insulated contact-points intermediate the first and at each end thereof, and connected severally with the opposite end of the coil in the second magnet, O', an oscillating frame, B B' B' B², a series of keys, A A, corresponding to the numbers on the adding-wheel L, graduated in their movement and actuating the oscillating frame, a commutating-arm, K, connected with the opposite pole of the battery P, a contact-pin carried by said arm to traverse the two series of contact-points and to contact alternately in its movement with the one and the other, of an arm, S, projecting from the oscillating frame B B' B' B² to move in unison with it, an index-slide, Q, engaged by the outer end of said arm to be thrown up thereby a distance proportioned to the degree of movement produced in the frame by the depression of either key A, and a fixed plate provided with an opening through which the particular figure indicating the position of the slide will appear, all substantially in the manner and for the purpose herein set forth.

In testimony whereof I have signed my name to this specification in the presence of two subscribing witnesses.

CHAS. W. WEISS.

Witnesses:
J. F. ACKER, Jr.,
A. B. MOORE.